US008424968B2

(12) United States Patent
Humer et al.

(10) Patent No.: US 8,424,968 B2
(45) Date of Patent: Apr. 23, 2013

(54) SPLIT TUBE RETURN SPRING

(75) Inventors: Mladen Humer, West Bloomfield, MI (US); Karl Schafer, Holly, MI (US)

(73) Assignee: Lear Corporation, Southfield, MI (US)

( * ) Notice: Subject to any disclaimer, the term of this patent is extended or adjusted under 35 U.S.C. 154(b) by 305 days.

(21) Appl. No.: 12/897,169

(22) Filed: Oct. 4, 2010

(65) Prior Publication Data
US 2012/0080920 A1   Apr. 5, 2012

(51) Int. Cl.
*B60N 2/02* (2006.01)
*F16F 1/14* (2006.01)

(52) U.S. Cl.
USPC .......... 297/301.3; 267/160; 267/273

(58) Field of Classification Search ........... 297/301.3, 297/300.4; 267/273, 158, 160, 131
See application file for complete search history.

(56) References Cited

U.S. PATENT DOCUMENTS

| 2,925,264 | A | * | 2/1960 | Loehr | 267/284 |
| 3,071,366 | A | * | 1/1963 | Loehr | 267/284 |
| 3,995,892 | A | | 12/1976 | Hellman et al. | |
| 5,938,265 | A | * | 8/1999 | Oyabu et al. | 296/68.1 |
| 6,065,803 | A | * | 5/2000 | Li et al. | 297/301.3 |
| 6,631,954 | B2 | | 10/2003 | Amorin et al. | |
| 6,779,841 | B2 | * | 8/2004 | Eckendorff | 297/216.13 |
| 6,789,849 | B2 | | 9/2004 | Gray | |
| 7,281,766 | B2 | | 10/2007 | Fujita et al. | |
| 7,513,574 | B2 | * | 4/2009 | Nagayama et al. | 297/452.18 |
| 7,722,120 | B2 | * | 5/2010 | Toyooka et al. | 297/354.12 |

FOREIGN PATENT DOCUMENTS

| DE | 631146 | 6/1936 |
| DE | 1647929 | 12/1952 |

* cited by examiner

*Primary Examiner* — Sarah B McPartlin
(74) *Attorney, Agent, or Firm* — Brooks Kushman P.C.

(57) ABSTRACT

A tubular spring having a longitudinal slot that is attached between a movable member and a fixed attachment device. A recliner hinge assembly for a vehicle seat that includes an inboard recliner and an outboard recliner connected by a connecting rod. A split tube having a longitudinally extending slot is assembled over the connecting rod. The split tube biases the seat back toward a neutral position when the seat back is shifted to a position that is angularly offset from the neutral position.

11 Claims, 3 Drawing Sheets

SPLIT TUBE RETURN SPRING

TECHNICAL FIELD

This application relates to spring return mechanisms.

BACKGROUND

Spring return mechanisms bias a movable member to return to a neutral position, or starting position. Power springs (or clock springs) and torsion bars are the types of springs that are used in spring return mechanisms.

Vehicle seats may include recliner mechanisms that are used to position a seat back in a selected angular orientation relative to a seat base. Recliner mechanisms generally include selectively lockable pivotable plates. Two recliner mechanisms are usually provided on the inboard and outboard sides of the vehicle seat. The two recliner mechanisms on opposite sides of the vehicle seat may be interconnected by a connecting rod that coordinates locking and unlocking of the two recliner mechanisms on opposite sides of the vehicle seat.

When a vehicle seat is repositioned to change the tilt angle of the seat back relative to the seat base, the seat occupant generally pushes back against the seat back while the recliners are unlocked. A pair of wound torsion springs or torsion bars may be provided in a vehicle seat back to bias the seat back to move in the forward vehicle direction. The wound torsion springs or torsion bars apply a force to the seat back urging the seat back to a more upright position. Wound torsion springs increase the cost of vehicle seats and require space inside the seat that increases the total space required for the seat recliner mechanism. The wound torsion springs must be assembled to the vehicle seat back and recliner hinges during the seat assembly process.

Some vehicle seats are folded in two different directions to be stored or to be moved in a tilt-and-tumble operation. It may be desirable to provide assistance with lifting a seat component in both clockwise and counter-clockwise directions but to do so with conventional power springs, two separate sets of springs are required. Power springs are usually only used in a compressive direction. Using power springs to create a biasing force by expanding the spring is not generally recommended. Using two sets of springs increases space requirements and also increases cost.

There is a need for a recliner return spring that reduces the cost of the vehicle seat, simplifies assembly and reduces the package space required for the return spring mechanism. There is also a need for a bi-directional spring that can provide a spring assist in both rotational directions while minimizing cost and space requirements.

Applicants have developed a split tube spring that addresses the above problems and others as will be understood by one of ordinary skill in the art.

SUMMARY

A spring assembly comprises a tubular member that defines a slot that extends longitudinally through the tubular member. A first attachment device secures the tubular member to a movable member. A second attachment device secures the tubular member to a static member. The spring assembly biases the movable member toward a neutral position when moved to an angularly offset location from the neutral position.

The spring assembly may be embodied in a split tube seat back assist spring that can be applied to a front seat or back seat. The split tube concept may also be applied to provide a return spring for a fold and tumble mechanism of a second or third row seat. The split tube spring assembly may be used in various applications in vehicle seats and may also be used in other applications that are not related to vehicles.

The split tube offers advantages of reducing the number of components required to provide the return spring function. The split tube provides a simpler pre-loading process and relatively easy to assemble. A single split tube may replace two torsion bars, two power springs, or two helical springs and a reduced number of brackets may be required to attach the tube to the seat back and recliner hinges. The split tube may be assembled around the recliner connecting rod and extends between the recliner hinges to reduce the space required.

A recliner return spring is disclosed that includes a split tube that is attached to a seat back and at least one of the recliner hinges. The split tube is assembled to the seat in a relaxed, or non-tensioned, condition. When a vehicle occupant repositions the seat by pressing against the seat back, torque is applied to the split tube. The split tube twists in response when torque is applied to the split tube. The seat back may then be locked in place at the desired angular orientation. When the recliner hinges are released, the split tube exerts a biasing force on the seat back to return the seat back to its initial position.

The split tube may be attached by a bracket to one or both recliners. The split tube may be attached to the seat back by a bracket located either at the center of the split tube. If the split tube is attached to a recliner hinge, the point of attachment to the seat back may be located closer to the opposite recliner hinge.

The split tube may reduce the part count required for a vehicle seat and offers a simplified assembly process. The use of the split tube may potentially reduce the cost and packaging space requirements of the recliner mechanism and vehicle seat and may also reduce the mass of the assembly and, in turn, vehicle seat.

The above advantages and other features will be better understood in view of the attached drawings and the following detailed description of the illustrated embodiments.

DETAILED DESCRIPTION

A detailed embodiment of the present invention is disclosed below. The disclosed embodiment is merely an example of the invention that may be embodied in various and alternative forms. The figures are not necessarily to scale, some features may be exaggerated or minimized to show details of particular components. The specific structural and functional details disclosed are not to be interpreted as limiting the claims. The disclosed embodiment is a representative basis for teaching one skilled in the art how to practice the invention.

Figure 1:
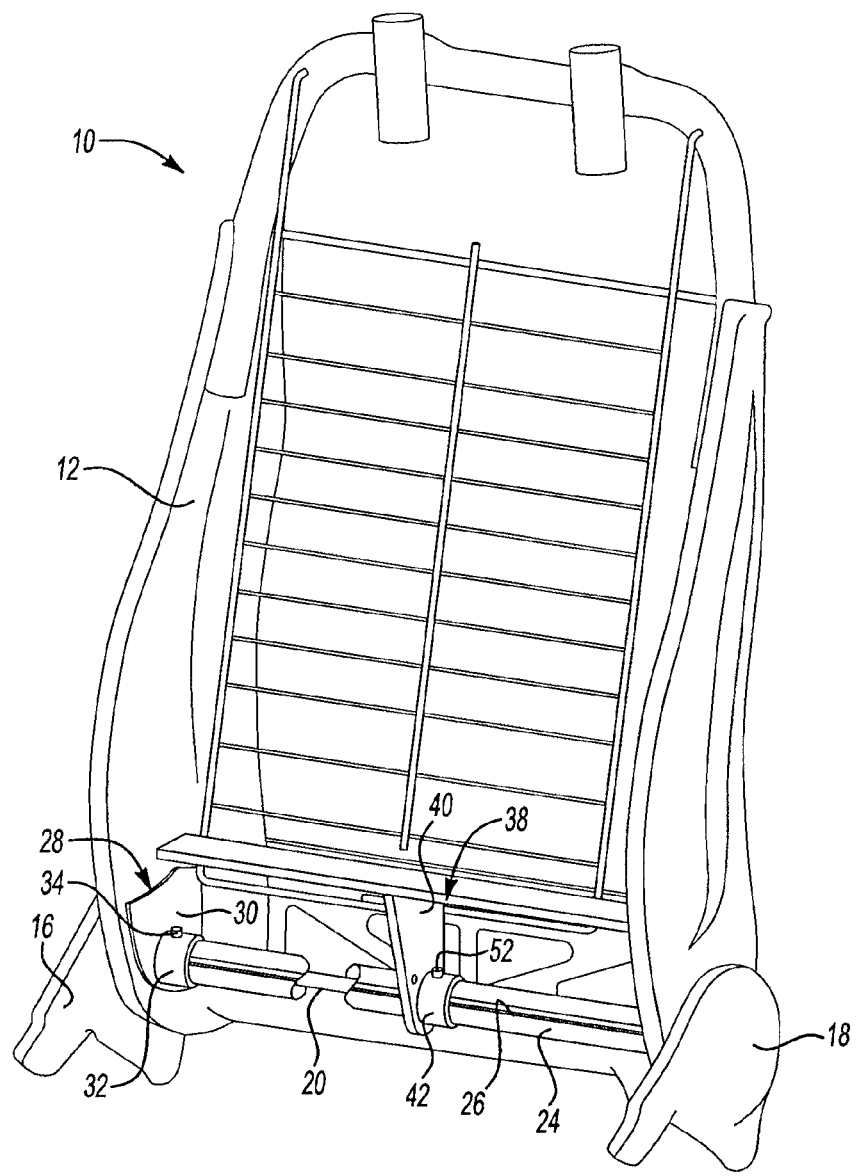
FIG. 1 is a perspective view of a portion of a vehicle seat including a seat back and recliner mechanism having a split tube spring assembly made according to the present invention.

Referring to FIG. 1, a vehicle seat 10 is partially illustrated with a seat back frame 12 shown in conjunction with an inboard recliner hinge 16 and an outboard recliner hinge 18. The inboard recliner hinge 16 and outboard recliner hinge 18 are connected by a connecting rod 20. The connecting rod 20 coordinates locking and unlocking the inboard and outboard recliner hinges 16, 18 as the position of the seat back frame 12 is changed. The recliner hinges 16, 18 are of a discontinuous, or manual, type in which the hinges 16, 18 are manually released by disengaging a locking mechanism of the recliner hinges 16, 18 to facilitate repositioning of the seat back 12 while the hinges are released. When the hinges 16, 18 are re-engaged, the seat back frame 12 is locked in position.

Figure 1A:
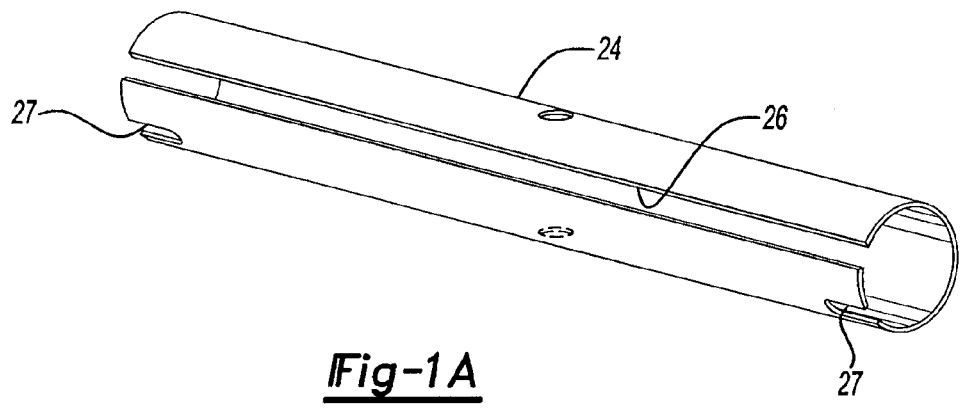
FIG. 1A is a perspective view of the split tube of the spring assembly.

A split tube 24 is assembled over the connecting rod 20 and functions as a spring. The split tube 24, as shown in FIG. 1A, has a longitudinal slot 26 extending longitudinally through the split tube 24. The slot is provided to make the tube more compliant in that it is easier to twist. Various changes may be made to obtain the desired degree of compliance including changing the length of the tube, changing the attachment points for the tube, changing the diameter of the tube, altering the material used to make the tube, changing the wall thickness of the tube, or changing the width of the slot. The split tube may be made from high carbon steel that is austempered.

Split tube 24 is illustrated as a circular cross-section tube but it could be square, oblong, polygonal or any other desirable shape. The term tubular as used in this application should be construed to include any shape and should not be limited to cylindrical tubes. A pair of notches 27 are provided on each end of the split tube 24. The notches 27 may be position at a diametrically opposed location relative to the longitudinal slot 26 or may be located within a wide range of locations that are angularly offset from the longitudinal slot 26.

Split tube 24 is received in a tube end receptacle bracket generally indicated by reference numeral 28 on either one or both sides of the split tube 24. The tube end receptacle bracket 28 includes a seat frame reinforcement 30 and an end receiving sleeve 32. One end of the split tube 24 is received in the end receiving sleeve 32. The ends of the split tube are rotationally fixed but must be free to move to limited extent in the longitudinal direction to allow for the tube ends to shift when the tube 24 is twisted. While only the inboard recliner hinge 16 is shown to include the tube end receptacle bracket 28 in FIG. 1, it should be understood that a mirror image tube end receptacle bracket 28 may be provided in conjunction with the outboard recliner hinge 18.

A frame attachment anchor is generally indicated by reference numeral 38 and includes a bracket 40 and a collar 42. The anchor 38 is welded or otherwise fastened to the seat back frame 12. The anchor 38 is secured to the split tube 24 by the collar 42. As shown in FIG. 1, the frame attachment anchor 38 is centrally disposed on the seat back frame 12. In this embodiment, a tube end receptacle bracket 28 would be preferably provided on both the inboard recliner hinge 16 and the outboard recliner hinge 18. The split tube 24 in this embodiment may function as two springs connecting the respective recliner hinges 16, 18 to the frame attachment anchor 38. When the frame attachment anchor 38 is secured to the center of the split tube 24, the effective spring length is approximately equal to one half of the length of the split tube 24.

In an alternative embodiment, the split tube 24 may be assembled to one tube end receptacle bracket 28 and the frame attachment anchor 38 could be assembled adjacent to the opposite recliner hinge from that to which the tube end receptacle bracket 28 is disposed. This embodiment provides a longer effective spring element.

Figure 2:
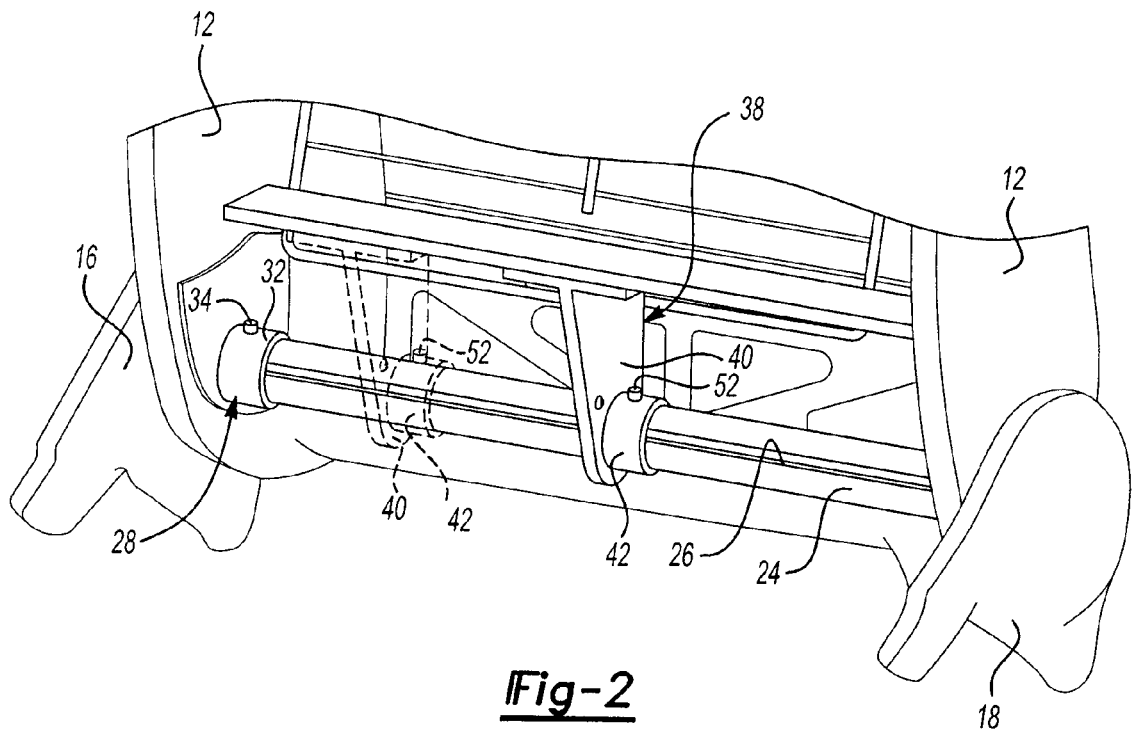
FIG. 2 is a fragmentary perspective view of the vehicle seat and split tube recliner mechanism in a neutral position.

Referring to FIG. 2, the seat back frame 12 is shown assembled between the inboard recliner hinge 16 and the outboard recliner hinge 18. The split tube 24 includes a longitudinal slot 26 that extends between the sides of the seat back frame 12 adjacent the inboard recliner hinge 16 and the outboard recliner hinge 18. The split tube 24 is assembled to opposite tube end receptacle brackets 28 that are part of the inboard recliner hinge 16 and the outboard recliner hinge 18. As previously described, the tube end receptacle bracket 28 on each end includes a seat frame reinforcement 30 that is welded or otherwise secured to the seat back frame 12.

An end receiving sleeve 32 is also provided on both sides of the split tube 24 and is secured to the split tube 24 by a pin 34 that is received in the slot 27. The frame attachment anchor 38 is provided centrally on the split tube 24. The frame attachment anchor 38 includes the bracket 40 and collar 42 that are secured to the split tube 24 in a central location. In FIG. 2, the vehicle seat is shown with the split tube 24 not displaced from its relaxed, or neutral, position. When the seat is assembled, the split tube 24 is may be assembled to the seat in the neutral or relaxed position. Alternatively to provide lifting assistance the seat back frame 12 may be attached to the split tube 24 in a pre-loaded condition with the seat back locked in place while the split tube is twisted and under tension.

The split tube 24 may be incorporated in a second row seat or a rear seat to provide bi-directional lift assistance in both the clockwise and counter-clockwise directions. For example, a split tube having a range of motion of 110° may be set to a design position with the neutral position being at about 53° from the normal upright position of the seat back frame 12. The seat back would be biased in the forward direction for the first 53° of movement. If the seat back is then rotated further in the forward vehicle direction, the split tube would bias the seat back frame 12 back toward the neutral position as it is rotated through the remaining 57° of the range of motion. The angles indicated are intended as examples and it should be understood that other angular settings and ranges of motion may be used. This biasing force operates to provide lift assistance as the seat back frame is returned to the upright position.

The spring response of the split tube 24 is approximately linear in rotational directions within the elastic deformation limits of the tube. Some deviation from a strictly linear response may be caused by the attachment brackets, tolerances and material variations.

Figure 3:
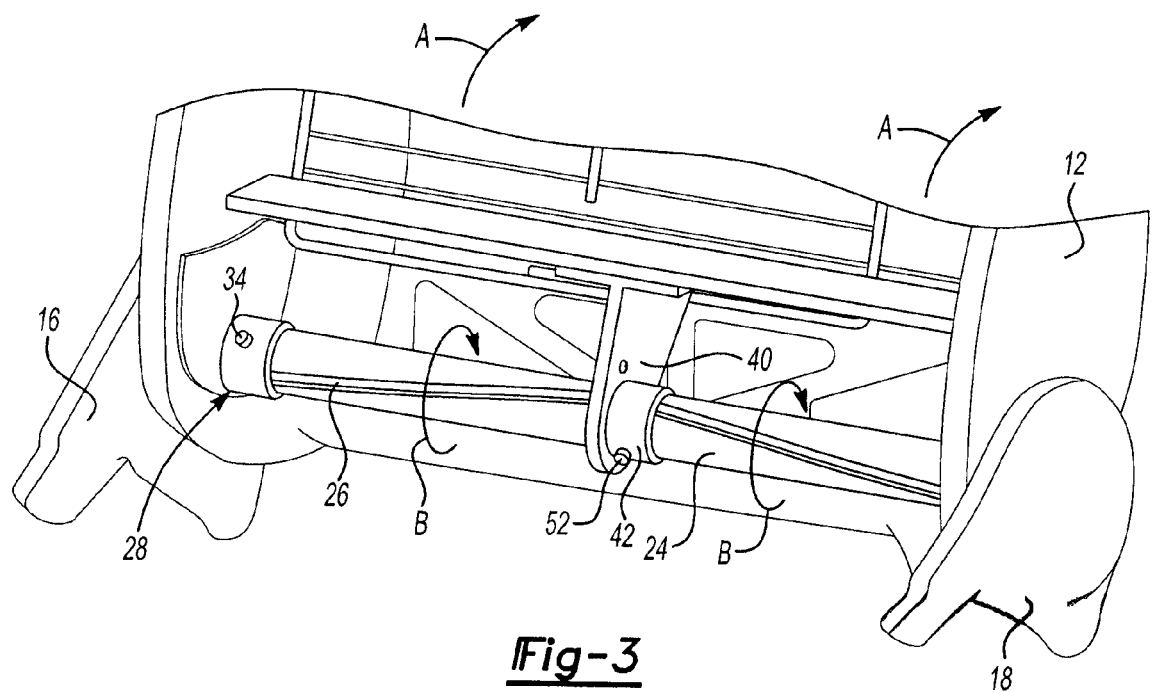
FIG. 3 is a fragmentary perspective view of the vehicle seat and split tube recliner mechanism in a tensioned position.

Referring to FIG. 3, the seat back frame 12 is shown with the split tube 24 connected between the inboard recliner hinge 16 and the outboard recliner hinge 18. In this position, the split tube 24 is under tension caused by displacement of the seat back in the direction indicated by arcuate arrows A above FIG. 3. The displacement of the seat back causes the split tube 24 to twist as indicated by the arcuate arrows B shown adjacent to the split tube 24. In this position, the frame attachment anchor 38 rotates the central portion of the split tube 24 rearwardly while the tube end receptacle brackets 28 remain in a fixed position. The split tube 24 exerts a biasing force urging the seat back frame 12 to return to the neutral position shown in FIG. 2.

Figure 4:
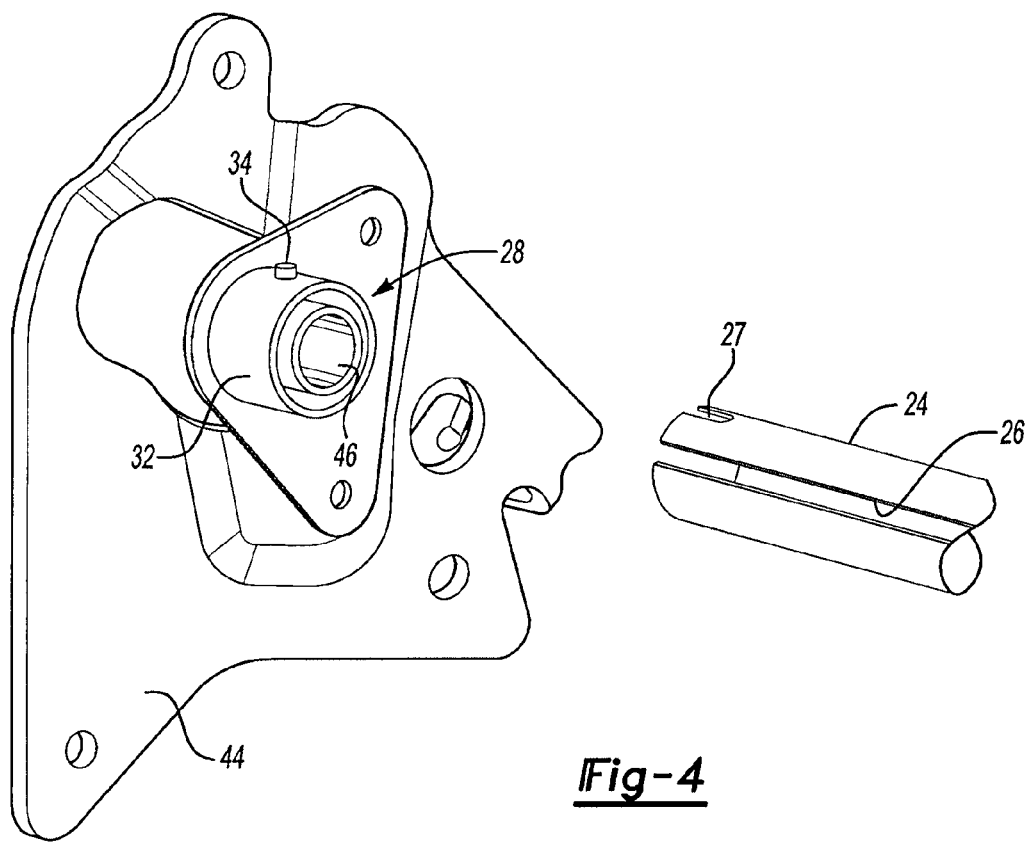
FIG. 4 is a fragmentary perspective view of a tube end receptacle with one end of the split tube and a seat base support.

Referring to FIG. 4, one end of the tube 24 is shown in position to be inserted into the tube end receptacle 28. A stationary seat base support 44 is illustrated that is attached in a fixed relationship and forms part of the seat base. The end receiving sleeve 32 encircles an inner tube 46 that is received in the split tube 24. In this way, when the pin 34 is inserted through the sleeve 32 and into the split tube 24 the tube end is secured in a fixed rotational relationship to the seat base support 44.

Figure 5:
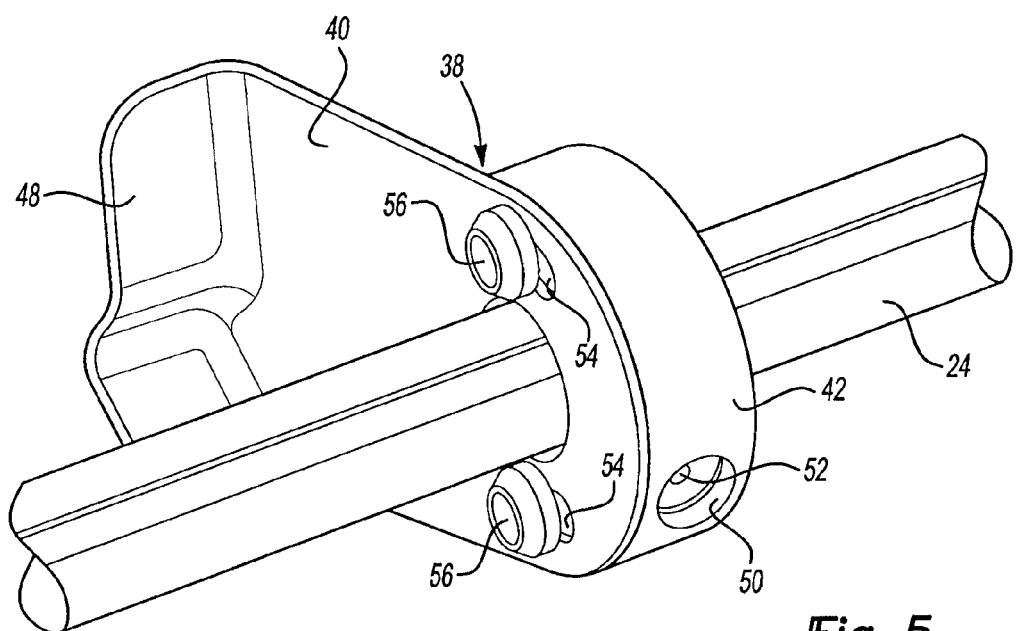
FIG. 5 is a fragmentary perspective view of a bracket used to anchor the split tube to a seat back frame.

Referring to FIG. 5, the frame attachment anchor 38 is shown in greater detail. The bracket 40 has a weld flange 48 that may be welded or otherwise attached to the seat back frame 12. The collar 42 defines a hole 50 into which a set screw 52 or the like is received to secure the collar 42 to the split tube 24. The bracket 40 includes two slots 54 that receive two bolts 56 that are secured to the collar 42. The slots 54 are provided to permit limited adjustment capability for assembly to the seat back frame. In its final form it may not be necessary to provide such an adjustment feature with standardized parts that are built to production specifications. In particular, collar 42 and bracket 40 could be combined in a single, smaller part and the bolts 56 could be eliminated. The size of the bracket and collar may also be reduced in size to reduce space requirements and reduce the mass of the mechanism.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A spring assembly for a vehicle seat including a seat base, a seat back, and a recliner assembly connecting the seat back to the seat base in a pivoting relationship, the recliner assembly including a first recliner hinge and a second recliner hinge connected together by a connector rod, wherein the spring assembly comprises:
    a tube that defines a slot that extends longitudinally through the tube;
    a bracket that secures the tube at one point between the first and second recliner hinges to the seat back, wherein the bracket is attached to the seat back closer to the first recliner hinge than the second recliner hinge and the tube is secured to the second recliner hinge;
    wherein the tube has a tube end that is secured to a receptacle that retains the tube end in a rotationally fixed relationship, wherein the spring assembly biases the seat back toward a neutral position at a first angular orientation when the seat back is shifted to a position that is angularly offset from the neutral position.

2. The spring assembly of claim 1 wherein the spring assembly is secured to both of the first and second recliner hinges and the bracket is secured to the seat back at the mid-point of the tube between the first and second recliner hinges.

3. The spring assembly of claim 1 wherein the connector rod is disposed within the tube of the spring assembly.

4. the spring assembly of claim 1 wherein the bracket is secured to the seat back at a lower portion of the seat back, wherein the bracket defines an opening through which the tube extends, and wherein the tube is secured to the bracket to prevent the tube from pivoting relative to the bracket within the opening.

5. The spring assembly of claim 1 wherein the bracket is welded to the seat back.

6. The spring assembly of claim 1 wherein the bracket is fastened to the seat back.

7. The spring assembly of claim 1 further comprising a collar that is assembled to the bracket.

8. The spring assembly of claim 1 further comprising a tube receptacle bracket that receives one end of the tube in a non-pivoting relationship, and wherein the tube receptacle bracket is attached in a rotationally fixed relationship to a portion of the at least one of the first and second recliner hinges that is stationary relative to the seat base.

9. A method of assembling a recliner assembly to a vehicle seat including a seat base and a seat back comprising:
    attaching a first and a second recliner hinge each to one of two sides of the seat back and the seat base for the seat back to pivot relative to the seat base; and
    securing a longitudinally split tube between the seat back and at least one of the recliner hinges with a first part of the split tube being rotationally fixed relative to the seat base and a second part of the split tube being fixed relative to the seat back, wherein the step of securing the split tube further comprises securing a first end of the split tube to the first recliner hinge and securing the split tube to the seat back closer to the first recliner hinge than the second recliner hinge.

10. The method of claim 9 wherein the step of securing the split tube to the at least one recliner hinge comprises securing a first end of the split tube to the first recliner hinge and securing a second end of the split tube to the second recliner hinge.

11. The method of claim 9 wherein the step of securing the split tube further comprises securing the middle of the split tube to the seat back.

\* \* \* \* \*